United States Patent
Babun et al.

(10) Patent No.: US 10,242,193 B1
(45) Date of Patent: Mar. 26, 2019

(54) METHOD OF RESOURCE-LIMITED DEVICE AND DEVICE CLASS IDENTIFICATION USING SYSTEM AND FUNCTION CALL TRACING TECHNIQUES, PERFORMANCE, AND STATISTICAL ANALYSIS

(71) Applicants: Leonardo Babun, Miami, FL (US); Hidayet Aksu, Miami, FL (US); A. Selcuk Uluagac, Miami, FL (US)

(72) Inventors: Leonardo Babun, Miami, FL (US); Hidayet Aksu, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/862,044

(22) Filed: Jan. 4, 2018

(51) Int. Cl.
*G06F 21/57* (2013.01)
*H04L 29/06* (2006.01)

(52) U.S. Cl.
CPC ............ *G06F 21/57* (2013.01); *G06F 21/577* (2013.01); *H04L 63/0876* (2013.01)

(58) Field of Classification Search
CPC ..... G06F 21/57; G06F 21/577; H04L 63/0876
See application file for complete search history.

(56) References Cited

U.S. PATENT DOCUMENTS

| | | | | |
|---|---|---|---|---|
| 6,937,572 B1* | 8/2005 | Egan | ................... | H04L 12/2856 370/252 |
| 7,971,255 B1* | 6/2011 | Kc | ........................ | G06F 21/566 713/164 |
| 9,699,529 B1* | 7/2017 | Petri | ........................ | H04Q 9/00 |
| 9,807,092 B1* | 10/2017 | Gutzmann | .......... | H04L 63/1458 |
| 2015/0063350 A1* | 3/2015 | Sundaram | ............. | H04L 43/062 370/389 |
| 2016/0164901 A1* | 6/2016 | Mainieri | ................ | G06N 7/005 726/23 |
| 2017/0034205 A1* | 2/2017 | Canedo | ............... | H04L 63/1441 |
| 2017/0079079 A1* | 3/2017 | Pathuri | ............... | H04L 41/0803 |

(Continued)

OTHER PUBLICATIONS

Dimjasevic, Marko et al., "Android Malware Detection Based on System Calls", UUCS-15-003, May 15, 2015, 15 pages. (Year: 2015).*

(Continued)

*Primary Examiner* — Michael Pyzocha
(74) *Attorney, Agent, or Firm* — Saliwanchik, Lloyd & Eisenschenk

(57) ABSTRACT

Methods for cyber physical systems device classification are provided. A method can include receiving system and function calls and parameters and a device performance index from an unknown CPS device and a device performance index of similar class of CPS devices, calculating an autocorrelation value between different realizations of the system and function calls and parameters of the known CPS device, determining whether the autocorrelation value is greater than a threshold amount, and storing the system and function calls and parameters and the device performance characteristics of the known CPS device in the database. A method can also include calculating a correlation between system and function calls and parameters of an unknown CPS device and known CPS devices classes included in the database, as well as determining whether the maximum correlation is also greater than a threshold amount.

20 Claims, 14 Drawing Sheets

(56) References Cited

U.S. PATENT DOCUMENTS

| | | | | |
|---|---|---|---|---|
| 2017/0126834 | A1* | 5/2017 | Fransen | H04L 67/303 |
| 2017/0264629 | A1* | 9/2017 | Wei | H04L 63/1416 |
| 2017/0308427 | A1* | 10/2017 | Cheng | G06F 11/0793 |
| 2018/0089004 | A1* | 3/2018 | Nitsan | G06F 11/3409 |
| 2018/0159881 | A1* | 6/2018 | Crabtree | H04L 63/1425 |
| 2018/0160327 | A1* | 6/2018 | Serrano Garcia | H04W 24/02 |

OTHER PUBLICATIONS

Radhakrishnan et al., "GTID: A technique for physical device and device type fingerprinting," IEEE Transactions on Dependable and Secure Computing, Sep./Oct. 2015, pp. 519-532, vol. 12, No. 5.

Rawat et al., "Cyber security for smart grid systems: status, challenges and perspectives," Proceedings of the IEEE Southeast Conference, Apr. 2015, pp. 1-6.

Kanovsky et al., "Detection of electronic counterfeit components: Reliability improvement of power electronic systems," 16th International Scientific Conference on Electric Power Engineering, May 2015, pp. 1-5.

Park et al., "A noise robust audio fingerprint extraction technique for mobile devices using gradient histograms," IEEE 5th International Conference on Consumer Electronics Berlin, Sep. 2015, pp. 287-290.

Graja et al., "BPMN4CPS: A BPMN extension for modeling cyber-physical systems," 25th IEEE International Conference on Enabling Technologies: Infrastructure for Collaborative Enterprises, Jun. 2016, pp. 152-157.

Van Opstal, "Supply chain solutions for smart grid security: building on business best practices," U.S. Resilience Project, Sep. 2012, pp. 1-33.

Zhou et al., "Acoustic fingerprinting revisited: generate stable device ID stealthy with inaudible sound," Proceedings of the 2014 ACM SIGSAC Conference on Computer and Communications Security, Nov. 2014, pp. 1-12.

Das et al., "Smartphone fingerprinting via motion sensors: analyzing feasibility at large-scale and studying real usage patterns," Cornell University Library, Computers and Society, May 2016, pp. 1-12.

Kohno et al., "Remote physical device fingerprinting," IEEE Transactions on Dependable and Secure Computing, May 2005, pp. 1-28.

Lanze et al., "Clock skew based remote device fingerprinting demystified," Global Communications Conference, Dec. 2012, pp. 1-7.

Spooren et al., "Mobile device fingerprinting considered harmful for risk-based authentication," Proceedings of the Eighth European Workshop on System Security, Apr. 2015, pp. 1-6.

Xu et al., "Device fingerprinting in wireless networks: challenges and opportunities," IEEE Communications Surveys and Tutorials, Draft, Jan. 2015, pp. 1-22.

Formby et al., "Who's in control of your control system? Device fingerprinting for cyber-physical systems," Proceedings of the 23rd Annual Network and Distributed System Security Symposium, Feb. 2016, pp. 1-15.

Kriger et al., "A detailed analysis of the GOOSE message structure in an IEC 61850 standard-based substation automation system," International Journal of Computers Communications and Control, Oct. 2013, pp. 708-721, vol. 8, No. 5.

"Communication networks and systems in substations—Part 7-1: Basic communication structure for substation and feeder equipment—Principles and models," IEC 61850-7-1 International Standard, 2003, pp. 1-116.

"Communication networks and systems in substations—Part 7-2: Basic communication structure for substation and feeder equipment—Abstract communication service interface (ACSI)," IEC 61850-7-2 International Standard, 2003, pp. 1-178.

"Communication networks and systems in substations—Part 8-1: Specific communication service mapping (SCSM)—Mappings to MMS (ISO 9506-1 and ISO 9506-2) and to ISO/IEC 8802-3," IEC 61850-8-1 International Standard, 2004, pp. 1-140.

"Open source libraries for IEC 61850 and IEC 60870-5-104," Libiec61850.com, Feb. 2016, http://libiec61850.com/libiec61850/documentation/.

Akkaya et al., "System engineering for industrial cyber-physical systems using aspects," Proceedings of the IEEE, May 2016, pp. 1-10, vol. 104, No. 5.

Deng et al., "Vulnerabilities and countermeasures—a survey on the cyber security issues in the transmission subsystem of a smart grid," Journal of Cyber Security and Mobility, Jul. 2012, pp. 251-276, vol. 1.

Bencsath et al., "The cousins of stuxnet: duqu, flame, and gauss," Future Internet, Nov. 2012, pp. 971-1003, vol. 4.

Konstantinou et al., "Cyber-Physical systems: a security perspective," 2015 20th IEEE European Test Symposium, May 2015, pp. 1-8.

Koushanfar et al., "Can EDA combat the rise of electronic counterfeiting," Proceedings of the 49th Annual Design Automation Conference, Jun. 2012, pp. 1-6.

Huang et al., "Counterfeit electronics: a rising threat in the semiconductor manufacturing industry," IEEE International Test Conference, Sep. 2013, pp. 1-4.

Sharma et al., "Experience with heterogenous clock-skew based device fingerprinting," Proceedings of the 2012 Workshop on Learning from Authoritative Security Experiment Results, Jul. 2012, pp. 9-18.

Das et al., "Do you hear what I hear? Fingerprinting smart devices through embedded acoustic components," Proceedings of the 2014 ACM SIGSAC Conference on Computer and Communications Security, Nov. 2014, pp. 1-12.

Neumann et al., "An empirical study of passive 802.11 device fingerprinting," 2012 32nd International Conference on Distributed Computing Systems Workshops, Jun. 2012, pp. 1-11.

Bratus et al., "Active behavioral fingerprinting of wireless devices," Proceedings of the First ACM Conference on Wireless Network Security, Mar. 2008, pp. 1-18.

Gao et al., "A passive approach to wireless device fingerprinting," IEEE/IFIP International Conference on Dependable Systems and Networks, Jun. 2010, pp. 1-10.

Uluagac et al., "A passive technique for fingerprinting wireless devices with wired-side observations," 2013 IEEE Conference on Communications and Network Security, Oct. 2013, pp. 1-9.

Garfinkel, "Traps and pitfalls: practical problems in system call interposition based security tools," The 10th Annual Network and Distributed System Security Symposium, Feb. 2003, pp. 1-14.

* cited by examiner

Algorithm 1: Generate Signature (Learning Phase)

1: $iterations \leftarrow 30$
2: $PSCL_{lists} \leftarrow null$
3: $DPI_{lists} \leftarrow null$
4: for $i = 0$ to $iterations - 1$ do
5:     $PSCL_{lists}[i] \leftarrow getParamList()$
6:     $DPI_{lists}[i] \leftarrow getDPIndex()$
7: end for
8: for $i \in 0...size(PSCL_{lists}) - 1$ do
9:     $gTVec \leftarrow \rho_{y_i, y_{i+1}}(PSCL_{lists}[i], PSCL_{lists}[i+1])$
10: end for
11: $grdTh \leftarrow \mu(gTVec)$
12: if $grdTh > 0.6$ then
13:     $SDB \leftarrow [\mu(PSCL_{lists}), \mu(DPI_{lists})]$
14: end if

FIG. 3

Algorithm 2: Identify Device Class (Prediction Phase)

1: $CPSsignList \leftarrow SDB$
2: $iterations \leftarrow 30$
3: $PSCL_{lists}, DPI_{lists}, CPSdeviceID \leftarrow null$
4: $signatue \leftarrow null$
5: for $i = 0$ to $iterations - 1$ do
6:    $PSCL_{lists}[i] \leftarrow getParamList()$
7:    $DPI_{lists}[i] \leftarrow getDPIndex()$
8: end for
9: $signature \leftarrow [\mu(PSCL_{lists}), \mu(DPI_{lists})]$
10: $corrXYmax \leftarrow 0$
11: for $i = 0$ to $size(CPSsignList) - 1$ do
12:    $corrXY \leftarrow \rho_{x,y}(CPSsignList(i), signature)$
13:    if $corrXY > 0.6$ & $corrXY > corrXYmax$ then
14:      $CPSdeviceID \leftarrow i$
15:      $corrXYmax \leftarrow corrXY$
16:    end if
17: end for
18: if $CPSdeviceID == null$ then
19:    $SDB \leftarrow signature$
20: end if

FIG. 4

METHOD OF RESOURCE-LIMITED DEVICE AND DEVICE CLASS IDENTIFICATION USING SYSTEM AND FUNCTION CALL TRACING TECHNIQUES, PERFORMANCE, AND STATISTICAL ANALYSIS

STATEMENT OF GOVERNMENT SUPPORT

This invention was made with government support under Grant No. DE-OE0000779 awarded by the Department of Energy. The government has certain rights in the invention.

BACKGROUND

A Cyber-Physical System (CPS) infrastructure includes various CPS equipment, such as RTUs, PLCs, and IEDs, that collect data from the infrastructure and monitor the health of the operations in real time. However, attackers can compromise CPS devices or they can use fake equipment to mimic real CPS devices in order to get access to critical resources within a CPS infrastructure. Similarly, CPS device manufactures can use unauthorized or untrusted hardware components during the device fabrication, resulting in compromised CPS devices that can be serious threat to the integrity of the CPS infrastructure. Such devices, which can be already part of an authorized CPS infrastructure, can poison the measurements, steal or leak important and sensitive information to outsiders, etc. Traditional security mechanisms may not be sufficient to prevent such attacks stemming from these CPS devices.

In general, device fingerprinting has been following two main paths: device host and device class fingerprinting. A great variety of techniques have been proposed to perform device host fingerprinting. For example, large scale host fingerprinting via motion sensors or microscopic deviations on clock skews to uniquely identify the devices.

In general, results from different works agree that clock skews based fingerprinting is especially vulnerable to simple countermeasures and also requires the analysis of several network packets for accurate results. It can be demonstrated that clock skews cannot be used as a unique fingerprinting method. Embedded acoustic devices (microphone and speakers) on smartphones can be used to uniquely fingerprint individual devices. Although accuracy values are reported in the range of 98% for this method, these results were obtained only in close range distances (0.1 meters). For distances between 1-2 meters the accuracy values decrease to a range between 92% and 88%. This further diminishes up to 65% for distances in the range of 5 meters. In other approaches, the frequency responses of devices' speakers were used to identify individual devices. As in the previous case, different types of acoustic interferences limit the application of the methods.

Certain device fingerprinting approaches characterize the devices' behavior as a response to specific network packets (a stimulant sent to the device also known as active fingerprinting) or simply by observing the device's traffic under regular network operations (passive fingerprinting). In spite of the positive results, these types of fingerprinting techniques also come with some limitations. In some cases, the proposed techniques only apply for specific types of network protocols (e.g., transport layer protocols like UDP, TCP, etc.). In other cases, the methods are vulnerable to system updates and/or the value of network dynamics such as WiFi channel characteristics, delay, etc.

As for the identification of different classes of devices, a passive blackbox based technique for determining the type of access point (AP) connected to a network can be applied. Although it is possible to fingerprint different device classes even for different types of APs, the technique can be limited to specific types of devices connected to the network. Another approach uses time as a baseline for device type fingerprinting. In this case, fingerprinting methods are based on two approaches (1) response time to network based interactions (cross layer fingerprinting) and (2) response time to physical operations (physical fingerprinting) can be used. However, this method can depend on the interaction of an unknown to be identified devices with others devices in the network, making the first approach dependent on network attributes like level of priority of TCP messages and ACK implementation. Further, the second approach proposed also depends on the SCADA system configuration. Since these methods take advantage of unique characteristics of ICS networks, their practical implementation is limited to only certain networks. Another approach for passive device class fingerprinting uses the timing distributions between the packets. However, implementation is limited to only local area networks (LAN) since the delay introduced by switches and routers can significantly impact the accuracy of the approach.

As discussed herein, a host based solution does not require the use of external stimulant (special network packets, audio tones, etc.) to achieve results, and can analyze the behavior of devices instead of the users. This technique does not require traffic monitoring or study the interaction of the devices with other network equipment and is lightweight. This technique can study device behavior while the devices perform normal device functionalities and operations. As more resource limited (e.g., CPS, IoT, and IIoT) devices are introduced in the market, an easy and simple device and class/type identification technique based on device fingerprinting presented in this work will be very beneficial.

BRIEF SUMMARY

Embodiments of the subject invention provide systems, methods, and configurable frameworks that incorporate system and function call tracing, performance analysis, and correlation techniques for device class and device identification on the device as opposed to other techniques.

Resource limited devices (e.g., (1) Cyber Physical Systems (CPS) devices (e.g. Remote Terminal Units (RTU), Programmable Logic Controllers (PLC), (2) Industrial Internet of Things (IIoT) devices (e.g., IIoT gateways, IIoT connector) and (3) Internet of Things (IoT) devices (e.g., wearable smart watches, smart locks, and smart glasses) can be found in many different domains. This technology can improve the security of IoT, IIoT, and CPS domains, help IoT, IIoT, and CPS adaptation, and improve cyber security of individuals in the entire nation. The technology is also applicable to the resource limited medical devices (e.g., remote patient monitoring, wireless implantable medical devices) in hospitals and healthcare centers. CPS like the smart grid or medical monitoring networks; and ICS networks like the ones found in water treatment and oil plants, can also benefit from the implementation of the framework. For critical infrastructure networks, such as smart grid, water treatments plants, etc., device and device class identification are vital for guaranteeing the integrity of data and customer privacy. Device and device class identification can be use as part of novel insider detection mechanisms that look for unauthorized user and devices trying to perform insider malicious activities like industrial espionage. Also, for very critical and restricted infrastructures like industrial and government networks, device and device class identification will help to detect unauthorized hardware and software on devices, as well as compromised devices and unauthorized device configurations.

BRIEF DESCRIPTION OF DRAWINGS

FIG. 2 shows examples CPS devices.

FIG. 3 shows an algorithm to obtain a CPS device signature for device class fingerprinting according to an embodiment of the subject invention.

FIG. 4 shows an algorithm for CPS device class identification according to an embodiment of the subject invention.

FIG. 7 shows plots of metrics evaluation on the experimental results after considering PSCL correlation only.

FIG. 12 shows plots of a metric evaluation on experimental results after considering correlation and device performance for decision.

DETAILED DESCRIPTION

Figure 1:
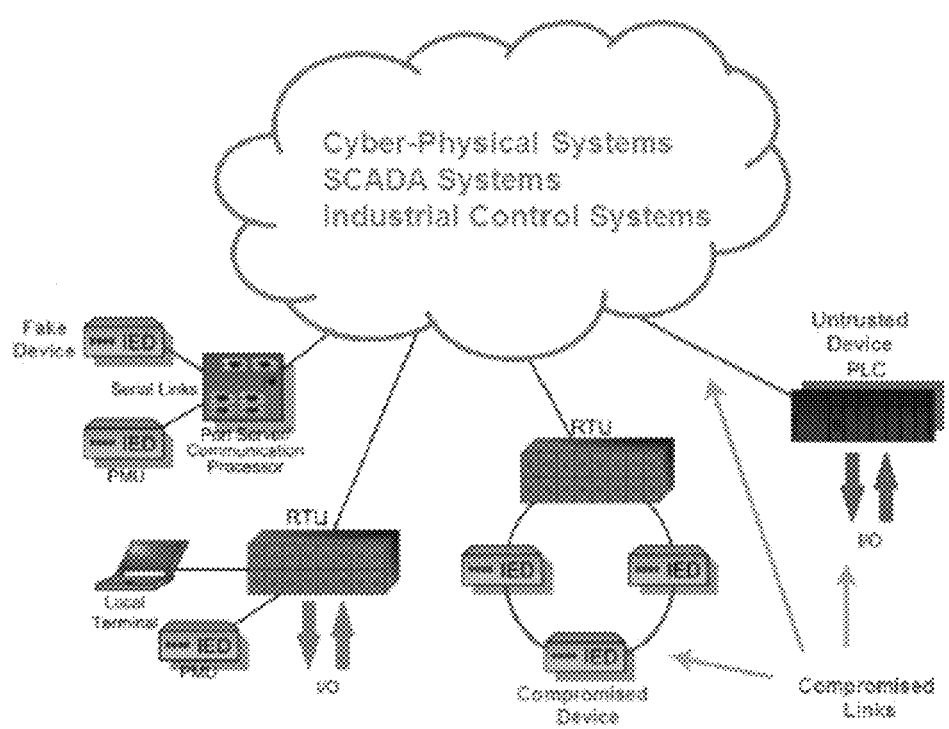
FIG. 1 shows a diagram of a CPS network with fake or compromised devices.

To address CPS contamination, a CPS device class fingerprinting methods capable of identifying CPS device classes and complement traditional security mechanisms is provide herein. The methods can include three techniques, (1) system and function call tracing (library interposition), (2) statistical correlation, and (3) performance analysis (CPS devices performance index), to create a unique CPS device class signature.

Embodiments of the subject invention provide methods and systems for a resource limited device identification framework via host fingerprinting. Examples of resource limited devices that the proposed technique can be used for include (1) Cyber Physical Systems (CPS) devices (e.g. Remote Terminal Units (RTU), Programmable Logic Controllers (PLC), (2) Industrial Internet of Things (IIoT) devices (e.g., IIoT gateways, IIoT connector) and (3) Internet of Things (IoT) devices (e.g., wearable smart watches, smart locks, and smart glasses). The method can utilize system and function call tracing techniques, system performance and statistical analysis to perform resource limited device and device class (or type) identification based on: (1) correlation between known device class signature and unknown devices and (2) analysis and similarities between Device Performance Index (DPI). The method contains two phases in the identification framework: (1) learning step for creating a secure database that contains signatures of known resource limited devices and (2) prediction step where the framework applies statistical techniques to measure the correlation between known resource limited device signatures and signatures from unknown devices. Based upon the level of correlation between known and unknown devices' signatures the framework will be able to perform device identification. The method can be applied for both device and device class/type identification purposes.

For device class identification via device fingerprinting, system and function call tracing techniques and performance analysis can be applied to create a unique signature for every different class (called device class fingerprinting) of resource limited devices. Each signature contains information about the system and function call lists obtained while the devices are performing specific operations and information about performance and computing resource utilization obtained during the same interval. Further, the obtained signature can be correlated with a set of predefined signatures stored in a database. The stored signature corresponding with the higher value of correlation will decide the device class or type.

Finally, for cases where correlation techniques cannot identify noticeable differences between different classes of devices, the framework looks for specific artifacts (e.g., changes of correlation between smaller segments of system calls) in specific regions inside the system and function call lists that could, on average, be used to create device class identification. By combining correlation results with performance analysis of memory and CPU utilization as well as execution time of the different devices, the framework can separate similar, but different classes of resource limited devices into completely different signature groups.

For the case of device identification, once the device class is determined, a more detailed analysis of the device behavior and performance can be applied to create specific device signatures that can be used later to identify specific devices within a specific device class. Similar techniques as for device class identification are applied for device identification but, in this case, a more detailed analysis is needed. For this purpose, the proposed invention applies high level of stress to the system (e.g., memory and CPU utilization) to be able to identify small changes on system and function call utilization and DPI. Such small changes identify the different signatures for the different devices belonging to a same class.

The most common definition of CPS highlights the deep integration between virtual and physical processes in a cyber-physical world. In this integrated separation of roles, the physical domain refers to physical resources that act over physical objects. On the other hand, the virtual domain constitutes a set of software and embedded systems intended to communicate and monitor the realization of such physical processes. Essentially, physical systems interact with real world processes while cyber systems control, monitor, and guarantee communication. In general, CPS can also be considered as a heterogeneous integration of several disciplines including control engineering, mechanics, sensors, electronics, networking, and software. There are several aspects that characterize CPS. Some of these aspects can be summarized as: type of task performed, event/command/action/interaction, mobility, availability, timing requirements, resource availability, etc. In general, they all can characterize either the physical or the virtual domain of CPS. Some of the most relevant characteristics of cyber systems can be characterized as:

Type of task performed: a cyber domain on CPS is normally intended to provide control and communication to the physical domain. Depending on the specific task or location inside the CPS architecture, the type of task performed can be part of a more complex centralized process or a simple service generated by a local host. In any case, individual cyber processes are expected to be simple, very specific, distributed actions.

Resource availability: resource availability in cyber processes depends on the type of device performing every specific task. In the particular case of the smart grid, for instance, different resource availability (resource rich and resource limited) can be found on devices performing different class of tasks (e.g. Programmer Logic Controllers (PLCs), Phasor Measurement Units (PMUs), etc).

Timing properties: In order to achieve the monitoring and control of physical processes, a very precise timing control is required. Temporal behavior on CPS is very precise and should not change too much over time.

Because of the integration of CPS with other critical infrastructures, security threats normally have more serious consequences if compared with traditional networks. For example, if a smart grid substation is compromised, a Denial of Service (DoS) type of attack could be performed. On another example, attackers with proper access to network aggregators can compromise privacy and other vital information from customers. The Stuxnet incident Duqu, Flame, and Gauss are few of the most significant cases of recent smart grid attacks. Besides compromising the security of systems, CPS privacy is another aspect that needs to be considered. CPS can contain huge amount of data that is vital for critical infrastructures. Data and information leakage constitutes a serious problem on CPS, especially because CPS design does not normally consider security aspects like data and information protection.

Figure 2A:
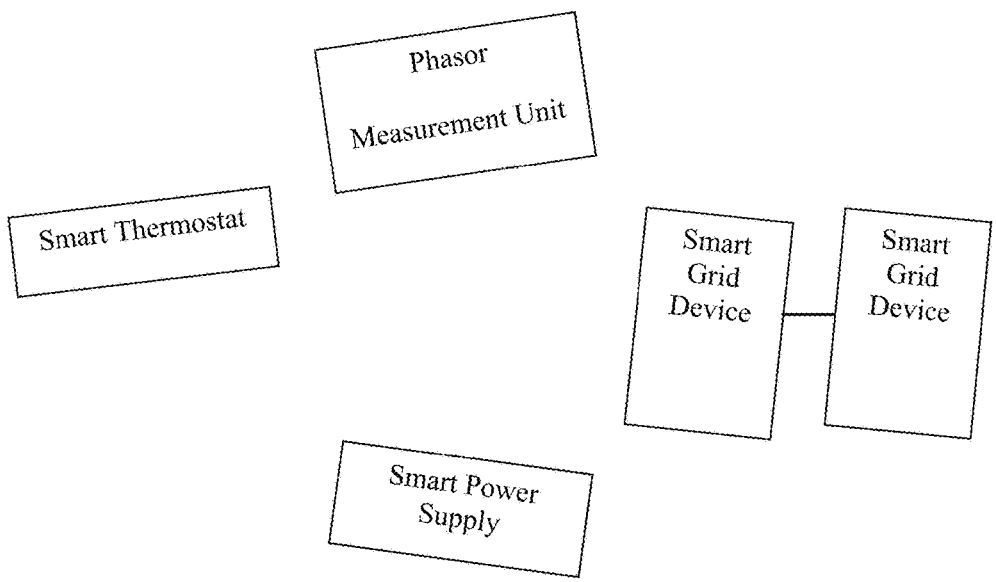
FIG. 2(a) shows examples of CPS devices from a smart grid.
Figure 2B:
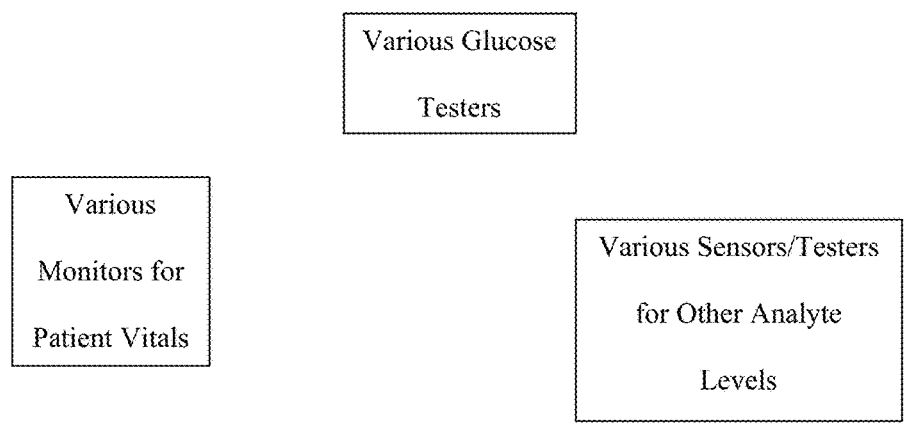
FIG. 2(b) shows examples of CPS devices related to health care.
Figure 2C:
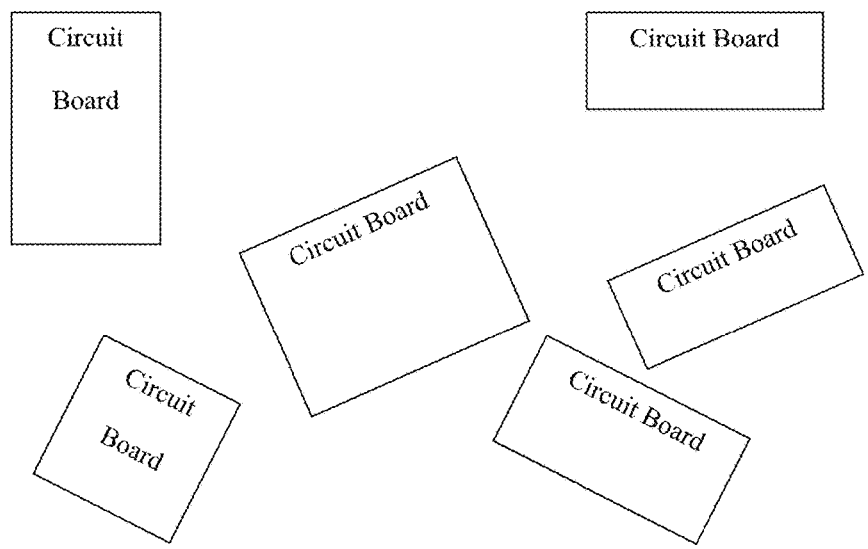
FIG. 2(c) shows examples of resource limited boards that can be configured to act as CPS devices.

In the particular case of CPS devices, as seen in FIG. 2, countermeasures normally focus on better control mechanisms in the supply chain to prevent that untrusted devices with fake software and/or hardware components can make their way into the CPS network. Unfortunately, these mechanisms seem to be insufficient. On the CPS side, intrusion detection mechanisms need to be implemented to detect unauthorized devices trying to get access into the network. Intrusion detection mechanism can be based on internet protocol (IP) or media access control (MAC) address monitoring as well as network traffic variables (e.g. unexpected high throughput). However, IP and MAC address can be forged and network dynamics can difficult the process of deciding about what level of traffic can be considered suspicious. In this scenario, device fingerprinting can give administrators and other security agents the necessary tools for detecting untrusted and/or unauthorized devices acting as part of restricted networks.

Current CPS networks like the smart grid and health care CPS can benefit from the application of the proposed methods since as they allow for the class classification of devices acting inside critical CPS networks. Feature aware fingerprinting will monitor device behavior to identify unauthorized devices trying to mimic real CPS devices and also, untrusted below performance devices coming from the supply chain to the CPS environment.

CPS networks differ from traditional IT networks in many aspects. First, even when both can be considered infrastructure with high device diversity, the tasks each network's devices perform are typically different. In traditional networks, devices perform a high variety of different tasks (e.g., video streaming, file transferring, social media communication, etc.) so it is expected to have a high level of network traffic at all times. As a consequence, in traditional networks, the number and type of devices connected to a specific router or gateway varies over time substantially. On the other hand, CPS networks are more predictable. That is, the amount of traffic and the type of messages interchanged by the different devices are normally within some certain ranges. As such, a CPS infrastructure is likely to remain the same over time and the CPS devices will not spend time and resources looking for better network/channel conditions. Another difference between CPS and traditional IT devices is that the ones in the first group are usually committed to specific tasks inside the CPS networks, while IT devices are normally executing tasks of different nature at the same time and hence, software and hardware resources need to be shared by several applications at the same time.

Moreover, traditional and CPS networks are both characterized for a high device diversity; however, the characteristics of the devices varies among different class of networks. Specifically in the CPS infrastructure, we can find devices from different classes with limited and rich computing resources, and diverse software configurations and architectures. In general, CPS device resources and software/hardware configurations depend on the specific task the device was designed for inside the CPS infrastructure. Hence, in CPS devices, where hardware and software characteristics are specific to the device's functionality, small changes in the device configuration will be highly noticeable in the device's behavior. Fingerprinting techniques can exploit specific CPS characteristics to identify different CPS device classes based on the device behavior during their normal operations inside the CPS infrastructure. The technique does not depend on inter-device communication, thus no traffic analysis is needed. Exploitable CPS characteristics can include the following: (1) Diversity in hardware and software characteristics, (2) IEC61850 based applications, and (3) Multiple OSes:

The CPS device class fingerprinting technique can go through four different stages: (1) device feature acquisition, (2) device signature generation, (3) device correlation, and (4) decision. Host based fingerprinting can analyze the behavior of the unknown equipment under normal operating conditions. In general, the application of the method: (1) does not require traffic monitoring for long periods of time; (2) permits devices to be monitored under normal operating conditions; and (3) does not require an external stimulant to trigger special response from devices.

Device Feature Acquisition can include obtaining a list of features that every device generates as result of normal behavior as part of the CPS infrastructure. System call and function tracing techniques (for example, library interposition, and system call interposition) can be used to obtain all the system and function calls that a specific CPS device triggers while performing regular CPS operations. The value of specific parameters that every system or function call generates once it is triggered can be extracted from the system or function call list (for example, for malloc, a parameter would be the size Sa of memory allocated, for free would be the size Sf of memory freed, for open, the path of specific files opened and the value of specific flags, can be monitored). The resulting list of system and function calls and parameters can provide the following information from the devices: (1) amount and order in which the system/function calls are triggered, and (2) the values of specific parameters of system/function calls will provide information on how the CPS device manages memory and CPU resources along with the details of specific type of operations. This list of system and function calls and parameters is hereinafter referred to as parametric system call list (PSCL) and can be represented as:

$$PSCL_i = \{x_i \in X_i : \exists X_i \wedge X_i \neq \emptyset\}, \quad (1)$$

where $x_i$ represents the system and function calls and parameters from device i and $X_i$ represents the system and function call lists from device i.

To quantify the numeric values of the different system and function call lists and parameters, the framework can convert system/function call lists into random variables. To do this, a random value $\gamma_l$ is assigned to different types of system/function calls. At the end of this conversion process, every system/function call list can be converted into a numeric vector that describes the system/function call activity based on the values $\gamma_l$ assigned.

A second feature used to identify CPS device classes is the device performance index (DPI). Since a CPS device is not expected to change functionality over time, the average of system performance is also expected to remain the same over time. Also, as every class of CPS devices has specific functionalities, the way that every class of device performs under regular operating conditions can also be used for identification. The DPI is also a part of the unique device signature in addition to the PSCL. Three major system performance metrics can be used to create a three dimensional performance index: (1) memory utilization, (2) CPU utilization, and (3) real time of application execution. The DPI is given in Equation 2:

$$DPI = \bar{\alpha} \times \bar{\beta} \times \bar{\gamma}, \quad (2)$$

where: $\bar{\alpha}$ represents the average of memory utilization $\bar{\beta}$ represents average of CPU utilization, and $\bar{\gamma}$ represents the real time the application takes to execute specific tasks.

Device Signature Generation can include generating unique signatures for the CPS devices based on the particular features. In order to get reliable signatures, a ground truth device can be employed to obtain reliable signatures. In order to evaluate the reliability of the ground truth device, the autocorrelation of different PSCLs obtained from the same process in different time intervals can be calculated. To calculate the autocorrelation, the following equation can be used:

$$\rho Y_i Y_{i+t} = \frac{\sum y_i y_{i+t} - n \overline{y_i y_{i+t}}}{n s_{y_i} s_{y_{i+t}}}, \quad (3)$$

where $y_i$ and $y_{i+t}$ represents PSCLs from the same CPS process but from different time interval t, n represents the size of the array y (size of PSCL) and s represents the standard deviation.

Algorithm 1 details a process of obtaining a signature of a ground truth device.

Initially, in Line 1, the number of iterations is initialized and the local variables $PSCL_{lists}$ and $DPI_{lists}$ are declared. These variables contain the list of parameters from every iteration, i. Then, in Lines 5 and 6, system call tracing techniques are applied on the ground truth device to obtain the PSCL at different time intervals, t. Additionally, the DPI is calculated for each iteration. In Line 9 the autocorrelation vector between the different time intervals of PSCL is calculated. Later in Line 11, the average of all autocorrelation values is computed. Finally, if the autocorrelation value is greater than 0.6 from line 12 the CPS device is accepted as ground truth device and the signature is stored in the signature data base (SDB) (Line 13). It should be appreciated by one of ordinary skill in the art that the 0.6 correlation value can be modified to be configurable with different applications. The final signature has the following format:

$$[\mu(PSCL_{lists}), \mu(DPI_{lists})] \quad (4)$$

| Algorithm 1: Generate Signature (Learning Phase) |
| --- |
| 1:     iterations ← 30 |
| 2:     $PSCL_{lists}$ ← null |
| 3:     $DPI_{lists}$ ← null |
| 4:     for i = 0 to iterations − 1 do |
| 5:         $PSCL_{lists}$[i] ← getParamList( ) |
| 6:         $DPI_{lists}$[i] ← getDPIndex( ) |
| 7:     end for |
| 8:     for i ∈ 0...size($PSCL_{lists}$) − 1 do |
| 9:         gTVec ← $\rho_{yi,yi+t}$($PSCL_{lists}$[i], $PSCL_{lists}$[i + 1]) |
| 10:     end for |
| 11:     grdTh ← μ(gTV ec) |
| 12:     if grdTh > 0.6 then |
| 13:         SDB ← [μ($PSCL_{lists}$), μ($DPI_{lists}$)] |
| 14:     end if |

After obtaining the signatures for all known CPS devices (learning process), the tool is ready to perform CPS device class identification. This process, as seen in Algorithm 2, can start by obtaining the signature of the unknown CPS device following similar steps as in Algorithm 1. However, instead of calculating the autocorrelation, the signature of the unknown device can be assumed valid after n iterations (see, for example, Lines 2, 6 and 7 in Algorithm 2). After the signature of the unknown device is obtained from Line 9, the correlation between signature and all the unique CPS signatures previously stored in SDB (Line 12) can be calculated using Equation 5:

$$\rho_{XY} = \frac{\sum x_i y_i - n \overline{xy}}{n s_x s_y}, \quad (5)$$

where n represents the size of $X_0$ (ground truth PSCL), and $Y_i$ (unknown CPS device PSCL), $\bar{x}$ and $\bar{y}$ represents the mean, and $s_x$ and $s_y$ represent the standard deviation.

| Algorithm 2: Identity Device Class (Prediction Phase) |
| --- |
| 1:     CPSsignList ← SDB |
| 2:     iterations ← 30 |
| 3:     $PSCL_{lists}$, $DPI_{lists}$, CPSdeviceID ← null |
| 4:     signature ← null |
| 5:     for i = 0 to iterations − 1 do |
| 6:         $PSCL_{lists}$[i] ← getParamList( ) |
| 7:         $DPI_{lists}$[i] ← getDPIndex( ) |
| 8:     end for |
| 9:     signature ← [μ($PSCL_{lists}$), μ($DPI_{lists}$)] |
| 10:     corrXYmax ← 0 |
| 11:     for i = 0 to size(CPSsignList) − 1 do |
| 12:         corrXY ← $\rho_{x,y}$(CPSsignList(i), signature) |
| 13:         if corrXY > 0.6 & corrXY > corrXYmax then |

-continued

Algorithm 2: Identity Device Class (Prediction Phase)

```
14:         CPSdeviceID ← i
15:         corrXYmax ← corrXY
16:       end if
17:     end for
18:     if CPS deviceID == null then
19:       SDB ← signature
20:     end if
```

After computing the correlation between signatures stored in the SDB and the one obtained from the unknown device in Algorithm 2, the decision process starts. The logical condition in Line 12 states that (1) if the correlation between the unknown device and signature i from the database is greater than 0.6 (moderate to strong correlation) and (2) this value of correlation is the maximum obtained from Algorithm 2, then the unknown CPS device is deemed to be the same CPS device class as CPS device i from the database (Line 14). It should be appreciated by one of ordinary skill in the art that the 0.6 correlation value can be modified to be configurable with different applications. On the other hand, if condition in Line 13 is never satisfied, the unknown device is classified as UNKNOWN and the new signature is added to SDB. This last step updates SDB every time a new class of CPS device is analyzed. Later, this information can be used to create new signatures for the new class of CPS device.

Figure 5:
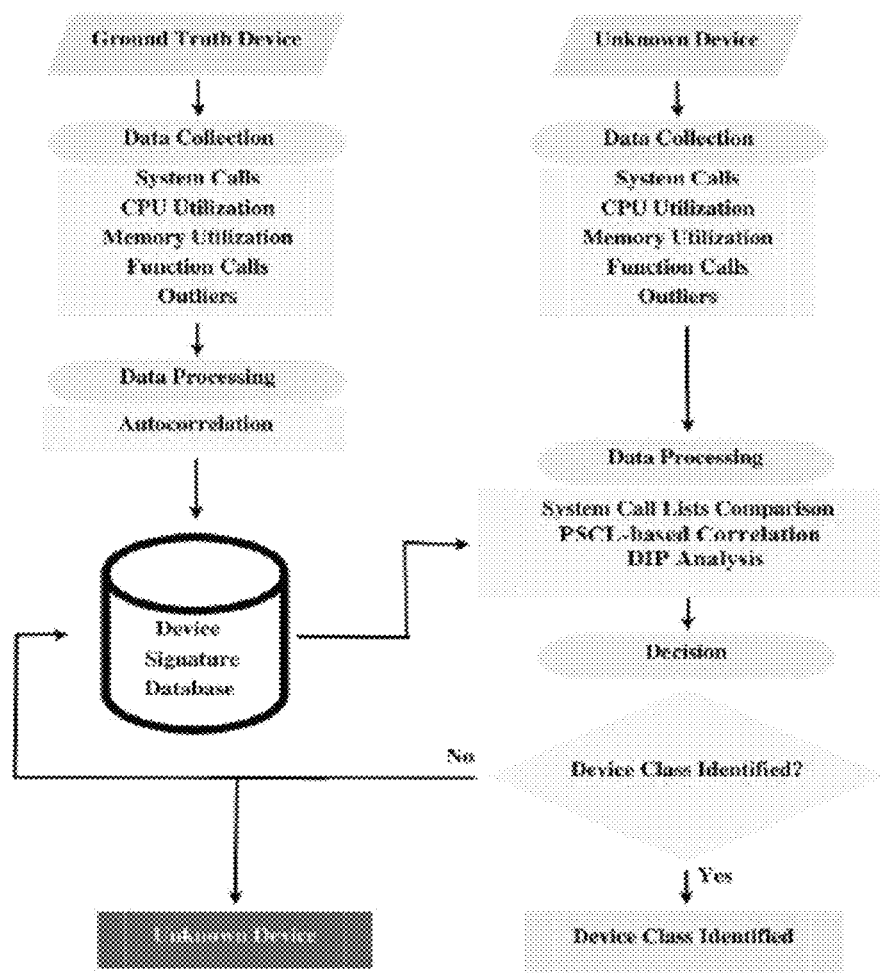
FIG. 5 shows a flow diagram of a device class identification mechanism using system and function call tracing techniques, statistical correlation, and device performance analysis according to an embodiment of the subject invention.

All processes described in Algorithms 1 and 2 are summarized in FIG. 5. As seen in FIG. 5, the signature database is fed by either by running the learning process and using autocorrelation to find ground truth devices or during the decision process, every time an unknown CPS device cannot be identified by the fingerprinting technique. The information stored in SDB during the decision process is used later to create new signatures if another unknown CPS device of the same class is found.

To measure the performance of the identification method, the standard classification metrics of accuracy, recall, precision, and specificity can be computed. These metrics are defined in Equations 6, 7, 8 and 9 respectively.

$$A_{CC} = \frac{(T_P + T_N)}{(T_P + T_N + F_P + F_N)}, \quad (6)$$

$$R_{EC} = \frac{T_P}{(T_P + F_N)}, \quad (7)$$

$$P_{REC} = \frac{T_P}{(T_P + F_P)}, \quad (8)$$

$$S_{PEC} = \frac{T_N}{(T_N + F_P)}, \quad (9)$$

where $T_P$ stands for true positive or the case where a CPS device is classified successfully; $T_N$ stands for true negative or the case where wrong signatures are rejected successfully; $F_P$ stands for false positive or the case where a CPS device is identified with the wrong signature; and finally $F_N$ stands for false negative or the case where a CPS device whose signature has been previously stored in the database cannot be identified correctly.

Autocorrelation techniques can be used to measure a CPS device's stability. High values of autocorrelation (for example, 0.6 and higher) between different PSCL realizations of the same device can show that device's processes do not change considerably over time. The same type of behavior would be then expected in CPS devices from the same class. Autocorrelation values obtained from the devices included in the CPS testbed as seen in Table 1, show that the current population of devices can be trusted to generate unique device signatures. As seen in Table 1, the level of autocorrelation remains high between devices from the same class (for example, $LM_1$ and $LM_2$, and $OP_{i1}$ and $OP_{i2}$), therefore it can be concluded that autocorrelation method is suitable for finding device unique signature.

TABLE I

Average of System Overhead Introduced as a Consequence of Using Fingerprinting Method on Specific CPS Applications.

| | No Fingerprinting | | | Fingerprinting | | | Overhead | | | |
|---|---|---|---|---|---|---|---|---|---|---|
| Devices | RT (s) value | Mem (KB) value | CPU (%) value | RT (s) value | Mem (KB) value | CPU (%) value | RT (s) % | Mem (KB) % | Total Mem (KB) % | CPU (%) % |
| $BB_1$ | 60.05 | 1304 | 3.0 | 60.055 | 1343 | 3.0 | 0.008 | 3 | 0.0039 | 0 |
| $BB_2$ | 60.025 | 652 | 2.0 | 60.049 | 696 | 2.03 | 0.04 | 6.7 | 0.0085 | 1.5 |
| $BB_3$ | 60.015 | 640 | 1.0 | 60.029 | 684 | 2.0 | 0.023 | 6.9 | 0.0085 | 0 |
| GZ | 60.02 | 2358 | 1.0 | 60.02 | 2419 | 1.0 | 0 | 2.6 | 0.0061 | 0 |
| $LM_1$ | 60.007 | 640 | 2.0 | 60.026 | 752 | 2.0 | 0.03 | 17.5 | 0.0218 | 0 |
| $LM_2$ | 60.001 | 640 | 2.0 | 60.02 | 752 | 2.0 | 0.03 | 17.5 | 0.0218 | 0 |
| ODR | 60.042 | 656 | 3.0 | 60.041 | 708 | 3.0 | 0 | 7.3 | 0.0026 | 0 |
| $OPi_1$ | 60.07 | 504 | 2.96 | 60.057 | 604 | 3.0 | ~0 | 19.8 | 0.01 | 1.35 |
| $OPi_2$ | 60.07 | 504 | 3.0 | 60.06 | 604 | 3.0 | ~0 | 19.8 | 0.01 | 0 |
| $RPi_1$ | 60.04 | 1568 | 1.0 | 60.04 | 1614 | 2.0 | 0 | 2.9 | 0.0046 | 0 |
| $RPi_2$ | 60.04 | 1585 | 2.0 | 60.04 | 1629 | 2.0 | 0 | 2.7 | 0.0044 | 0 |
| $RPi_3$ | 60.03 | 1575 | 1.0 | 60.038 | 1630 | 1.0 | 0.013 | 3.5 | 0.0055 | 0 |
| $RPi_4$ | 60.03 | 1566 | 1.0 | 60.041 | 1624 | 1.0 | 0.018 | 3.7 | 0.0058 | 0 |
| $RPi_5$ | 6.04 | 1537 | 5.0 | 60.047 | 1599 | 5.0 | 0.01 | 4 | 0.012 | 0 |
| $LPT_1$ | 60.001 | 2042 | 1.0 | 60.001 | 2154 | 1.0 | 0 | 5.5 | 0.0018 | 0 |
| $LPT_2$ | 60.013 | 2125 | 1.0 | 60.015 | 2173 | 1.0 | 0.003 | 2.2 | 0.0008 | 0 |

Figure 6:
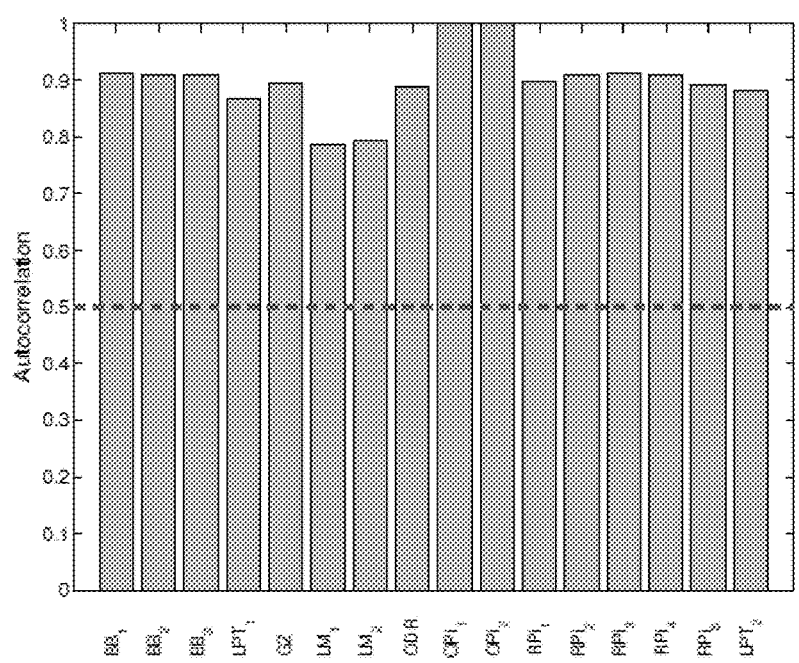
FIG. 6 shows a plot of autocorrelation results after applying the algorithm of FIG. 4 on all the devices from a CPS testbed.
Figure 7A:
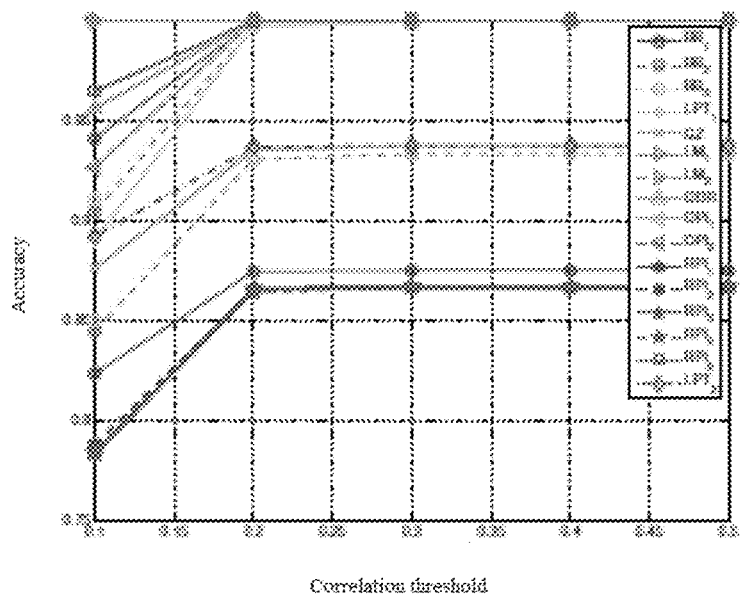
FIG. 7(a) Accuracy.
Figure 7B:
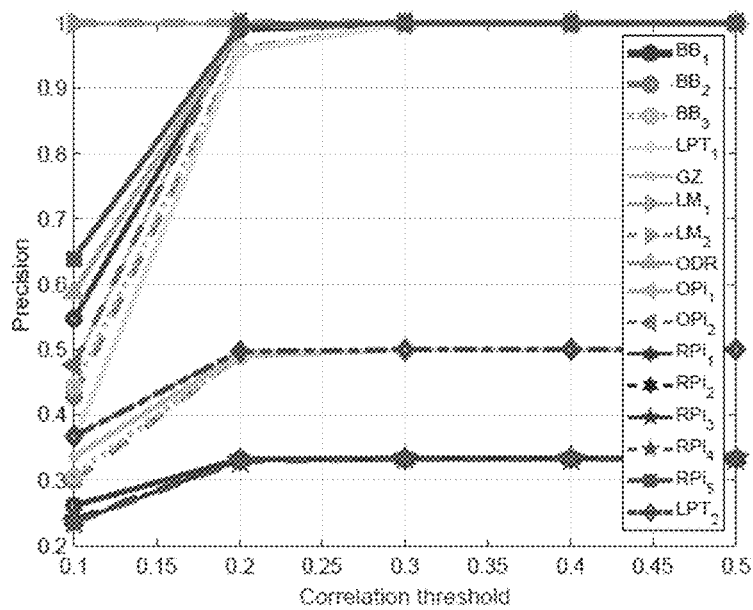
FIG. 7(b) Precision.
Figure 7C:
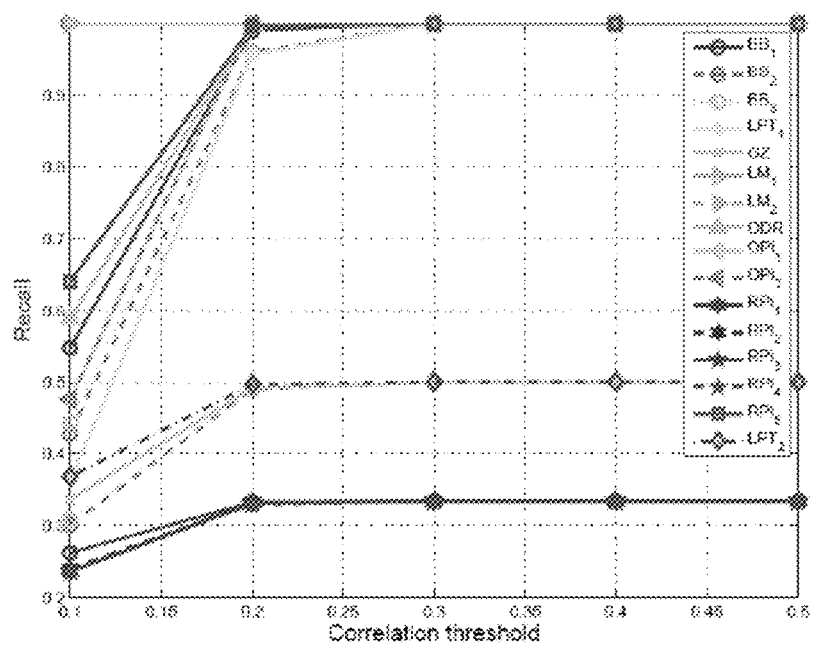
FIG. 7(c) Recall.
Figure 7D:
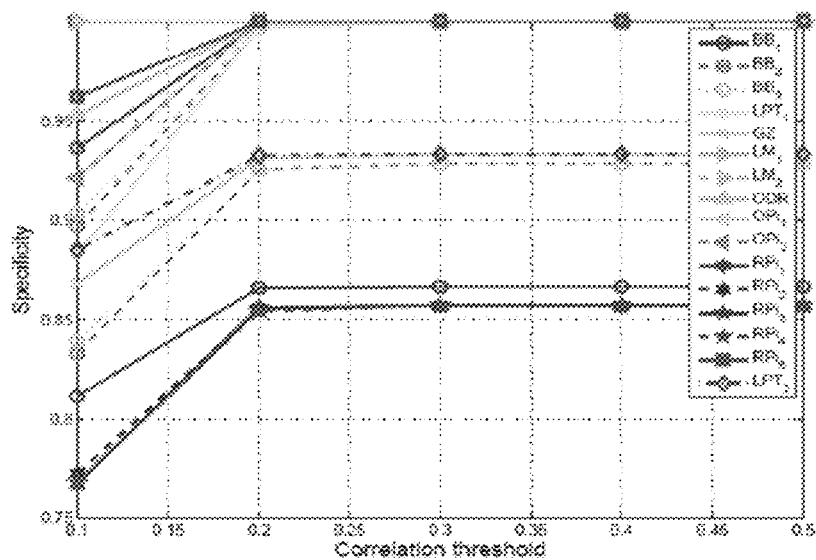
FIG. 7(d) Specificity.
Figure 9:
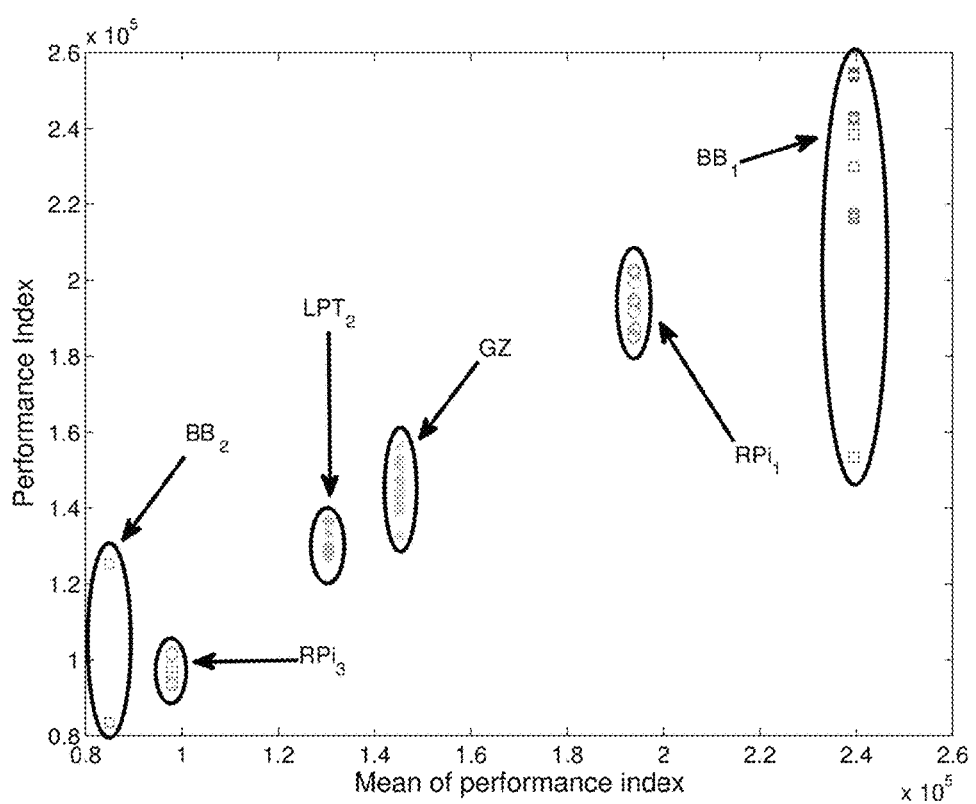
FIG. 9 shows a plot of a distribution of the DPI of the devices causing false positive decisions.

As seen in FIGS. 6 and 7, evaluating PSCL and DPI separately will lead to false positives that will decrease the performance metrics of the method. A decision map, as seen in FIG. 9, was obtained that separates all 11 different device classes that were originally included in the testbed (see, for example, Table II) by combining both approaches.

Embodiments of the methods described herein obtained accuracy values of 100% for 11 different device classes and the total of 16 devices included in the testbed (see, for example, FIG. 12). Additionally, the methods do not depend on network conditions and/or do not need to monitor devices' behavior for a long period of time to achieve reliable results. The results shown by the technique on the CPS device class identification were achieved without adding too much overhead to the system.

There are several benefits associated with the design of the lightweight fingerprinting technique: (1) Excellent detection rate: the methods demonstrated an excellent rate on the CPS device class identification after analyzing a representative set of 11 different device classes and 16 different devices in total, (2) Minimum overhead: the methods do not represent significant overhead on the use of computing resources, (3) Clear, straight forward and complementary solution: the method results in no heavy traffic analysis, network conditions, devices' interaction with the network, or external stimulant is needed. (4) Device class diversity: the device diversity regarding computer resource availability, software configuration, and hardware configurations is representative of real CPS device diversity, (5) Scalability: the methods can be applied on many other domains outside the CPS realm, (6) Security: the CPS device class fingerprinting technique can enhance traditional security mechanisms in CPS since it can be applied for the detection of unauthorized device intrusions or the identification of CPS devices that have been tampered in many ways, including malicious code injection, the use of unauthorized components during the CPS device fabrication, etc., and (7) Supply Chain, logistics: the CPS device class identification technique can be also utilized in supply chain, logistic operations for identifying and counting CPS devices, etc.

All the devices included in the CPS testbed are summarized in Table II. As shown in the table, a wide variety of real CPS devices are represented based on different levels of resource availability (e.g., RAM, CPU, etc.), different software architecture, and finally, different hardware characteristics.

TABLE II

Device Classes Used in CPS Testbed.

| Class # | Device Name | Device ID | Model Name | Hardware Specifications | Operating System | Release |
| --- | --- | --- | --- | --- | --- | --- |
| 1 | BeagleBone | $BB_1$ | Black | AM355x Cortex-A8 @ 1 GHz<br>512 MB DD3 RAM | Linux Beaglebone 4.1.5 | Debian 8.3 Jessie |
| 2 | BeagleBone | $BB_2$ | Black | AM355x Cortex-A8 @ 1 GHz<br>512 MB DD3 RAM | Linux Beaglebone 3.8.13 | Debian 7.9 Wheezy |
| 2 | BeagleBone | $BB_3$ | Black | AM355x Cortex-A8 @ 1 GHz<br>512 MB DD3 RAM | Linux Beaglebone 3.8.13 | Debiau 7.9 Wheezy |
| 3 | Gizmo | GZ | 2-1.0 | AMD GX210HA @ 1 GHz<br>1 GB DD3 RAM | Linux Ubuntu-mate 4.4.0 | Ubuntu 16.04 xenial |
| 4 | OlinuXino-Lime | $LM_1$ | A-10 | A10 Cortex-A8 @ 1 GHz<br>512 MB DD3 RAM | Linux A10Lime 3.4.90 | Debian 3.4.90 |
| 4 | OlinuXiao-Lime | $LM_2$ | A-10 | A10 Cortex-A8 @ 1 GHz<br>512 MB DD3 RAM | Linux A10Lime 3.4.90 | Debian 3.4.90 |
| 5 | Odroid | ODR | XU3 | HMP Samsung Exynos 5422 Cortex<br>A15 Quad core @ 2 GHz<br>A7 Quad core @ 900 MHz<br>2 GB DD3 RAM | Linux Odroid 3.10.96 | Ubuntu-Mate 16.04 |
| 6 | Orange Pi | $OPi_1$ | PC | H3 Quad core Cortex-A7 @ 1 GHz<br>1 GB DD3 RAM | Linux Orange Pi Kali 3.4.39 | Kali 2.0 |
| 6 | Orange Pi | $OPi_2$ | PC | H3 Quad core Cortex-A7 @ 1 GHz<br>1 GB DD3 RAM | Linux Orange Pi Kali 3.4.39 | Kali 2.0 |
| 7 | Raspberry Pi 2 | $RPi_1$ | 2B | Cortex-A7 @ 900 MHz<br>1 GB DD3 RAM | Linux Raspberry Pi 4.1.7 | Raspbian 8.0 jessie |
| 7 | Raspberry Pi 2 | $RPi_2$ | 2B | Cortex-A7 @ 900 MHz<br>1 GB DD3 RAM | Linux Raspberry Pi 4.1.7 | Raspbian 8.0 jessie |
| 8 | Raspberry Pi 3 | $RPi_3$ | 3B | Cortex A53 Quad core @ 1.2 GHz<br>1 GB DD3 RAM | Linux Raspery Pi 4.4.11 | Raspbian 8.0 jessie |
| 8 | Raspberry Pi 3 | $RPi_4$ | 3B | Cortex A53 Quad core @ 1.2 GHz<br>1 GB DD3 RAM | Linux Raspery Pi 4 4.11 | Raspbian 8.0 jessie |
| 9 | Raspberry Pi | $RPi_5$ | 1B | ARM1176 @ 700 MHz<br>512 MB DD3 RAM | Linux Raspberry Pi 4.1.13 | Raspbian 7.0 wheezy |
| 10 | Laptop | $LTP_1$ | Dell E6520 | Intel Core i7-2760 QM @ 2.4 GHz<br>6 GB DD3 RAM | Linux 3.19.0 | Ubuntu 14.04 trusty |
| 11 | Laptop | $LTP_2$ | Toshiba P55W | Intel Core i5-5200 @ 2.7 GHz<br>6 GB DD3 RAM | Linux 4.4.0 | Ubuntu 16.04 xenial |

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various readonly-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of device and device class classification, the method comprising:
providing a known cyber physical system (CPS) device;
extracting, by an extracting device, using system and function call tracing techniques, system and function calls and parameters from the known CPS device;
extracting, by the extracting device, using system and function call tracing techniques, system and function calls and parameters at different time intervals from the known CPS device;
calculating an autocorrelation value between different realizations of the system and function calls and parameters of the known CPS device;
determining whether the autocorrelation value is greater than a threshold amount; and
storing, in a memory (for example, memory of a machine, such as computer memory), the system and function calls and parameters of the known CPS device,
the database being subdivided into classes of CPS devices.

Embodiment 2

The method of embodiment 1, further comprising:
inserting the system and function calls and parameters in a vector expressed as follows:

$$PSCL_i = \{x_i \in X_i; \exists X_i / \backslash X_i \neq 0\},$$

where $x_i$ represents the calls and parameters from system and function calls from device i and $X_i$ represents system and function call lists from device i.

Embodiment 3

The method according to any of embodiments of 1-2, further comprising:
calculating the autocorrelation between the system and function calls and parameters of different executions of the known CPS device using the following expression:

$$\rho_{y_i y_{i+t}} = \frac{\sum y_i y_{i+t} - n \overline{y_i y_{i+t}}}{n s_{y_i} s_{y_{i+t}}},$$

$y_i$ and $y_{i+t}$ representing PSCLs from a same CPS process but from a different time interval t, n representing the size of the array y (size of PSCL), and s representing the standard deviation.

Embodiment 4

The method according to any of embodiments of 1-3, the threshold value of the autocorrelation value between the system and function calls and parameters of the different executions of the known CPS device being 0.6.

Embodiment 5

The method according to any of embodiments of 1-4, further comprising:
providing an unknown CPS device;
extracting, by the extracting device, using system and function call tracing techniques, system and function calls and parameters from the unknown CPS device;
calculating a correlation value between the system and function calls and parameters of the unknown CPS device and systems and function calls and parameters of each CPS device signature in the database;
determining whether the correlation value is greater than a threshold amount;
accepting the unknown device whose maximum correlation value is also greater than the threshold amount in the database as a known CPS device; and
storing in computer memory, the system and function calls and parameters of the unknown CPS device in the database.

Embodiment 6

The method of embodiment 5, further comprising:
storing the system and function calls and parameters of the unknown device whose correlation value is equal to or less than the threshold amount in the database as a new class of CPS device.

Embodiment 7

The method according to any of embodiments of 5-6, the threshold amount of the correlation between system and function calls and parameters of the unknown device and each system and function calls and parameters of each CPS device in the database being 0.6.

Embodiment 8

The method according to any of embodiments of 5-7, the correlation between the system and function calls and parameters of the unknown CPS device and the system and function calls and parameters in the database being calculated using the following expression:

$$\rho_{XY} = \frac{\sum x_i y_i - n \overline{xy}}{n s_x s_y},$$

n representing a size of $x_i$ (ground truth PSCL) and $y_i$ (unknown CPS device PSCL), $\overline{x}$ and $\overline{y}$ representing a mean, and $s_x$ and $s_y$ representing a standard deviation.

Embodiment 9

The method according to any of embodiments of 1-8, further comprising:

extracting, by the extracting device, device performance characteristics from the known CPS device.

Embodiment 10

The method of embodiment 9, the device performance characteristics including memory utilization, CPU utilization, and real time of application execution.

Embodiment 11

The method according to any of embodiments of 9-10, the device performance characteristics being expressed as the following equation:

DPI=$\bar{\alpha} \times \bar{\beta} \times \bar{\gamma}$, $\bar{\alpha}$ representing an average of memory utilization, $\bar{\beta}$ representing an average of CPU utilization, and $\bar{\gamma}$ representing a time period that an application takes to execute a specific task.

Embodiment 12

The method according to any of embodiments of 9-11, further comprising:
storing, in the computer memory, a device signature for each known CPS device and being expressed as follows:

[$\mu(PSCL_{lists}),\mu(DPI_{lists})$].

Embodiment 13

A (non-transitory) machine-readable storage medium (e.g., a (non-transitory) computer-readable medium) comprising stored instructions thereon, the instructions when executed causing a processor to:
receive system and function calls and parameters from a known CPS device;
receive device performance characteristics from the known CPS device;
receive system and function calls and parameters at different time intervals from the known CPS device;
receive device performance characteristics at different time intervals from the known CPS device;
calculate an autocorrelation value between the different realizations of the system and function calls and parameters of the known CPS device;
determine whether the autocorrelation value is greater than a threshold amount; and
store the system and function calls and parameters of the known CPS device whose autocorrelation value is greater than a threshold amount in a database,
the database being subdivided into classes of CPS devices.

Embodiment 14

The method of embodiment 13, the device performance characteristics being expressed as the following equation:

DPI=$\bar{\alpha} \times \bar{\beta} \times \bar{\gamma}$, $\bar{\alpha}$ representing an average of memory utilization, $\bar{\beta}$ representing an average of CPU utilization, and $\bar{\gamma}$ representing a time period the application takes to execute a specific task.

Embodiment 15

The method according to any of embodiments of 13-14, further comprising:
calculate the autocorrelation between the system and function calls and parameters between different realizations of the known CPS device with the following expression:

$$\rho_{Y_i Y_{i+t}} = \frac{\sum y_i y_{i+t} - n\overline{y_i y_{i+t}}}{n s_{y_i} s_{y_{i+t}}},$$

$y_i$ and $y_{i+t}$ representing PSCLs from a same CPS process but from a different time interval t, n representing a size of an array y (size of PSCL), and s representing a standard deviation.

Embodiment 16

The method according to any of embodiments of 13-15, the threshold value of the autocorrelation value between different realizations of the system and function calls and parameters of the known CPS device being 0.6.

Embodiment 17

The method according to any of embodiments of 13-16, the instructions when executed further causing the processor to:
receive system and function calls and parameters from an unknown CPS device;
calculate an correlation value between the system and function calls and parameters of the unknown CPS device and the system and function calls and parameters of each CPS class device in the database;
determine whether the correlation value is greater than a threshold amount;
accept the unknown device whose maximum correlation value is also greater than the threshold amount in the database as a known CPS device.

Embodiment 18

The method of embodiment 17, the threshold value of the correlation value between system and function calls and parameters of the unknown CPS device and the system and function calls and parameters of each CPS class device in the database being 0.6.

Embodiment 19

The method according to any of embodiment 17-18, the correlation between the system and function calls parameters of the unknown CPS device and the system and function calls and parameters of each CPS class device system in the database being calculated using the following expression:

$$\rho_{XY} = \frac{\sum x_i y_i - n\overline{xy}}{n s_x s_y},$$

n representing a size of $X_0$ (ground truth PSCL), and $y_i$ (unknown CPS device PSCL), $\bar{x}$ and $\bar{y}$ representing a mean, and $s_x$ and $s_y$ representing a standard deviation.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

In this section, experimental results after applying the CPS device class fingerprinting technique on the devices included in CPS testbed are presented. In all the tests, the results were obtained after averaging 30 different realizations for all the covered scenarios. The scenarios include the application of the Algorithms 1 and Algorithm 2 on all the devices included in Table II in order to: (1) generate a trustworthy signature database, (2) evaluate device similarity and differences, (3) identify different CPS device classes, and finally (4) evaluate the overhead that the technique causes on CPS devices' computing resources.

EXAMPLE 1

A first step in applying the fingerprinting technique can be to find a reliable set of unique signatures for the different CPS device classes.

The signature process uniquely uses autocorrelation between different realizations of PSCL. High values of autocorrelation (typically over 0.6) indicate that the device evaluated (which is assumed to be a real CPS device with no prior tampering or untrusted components) can be used as a ground truth device to create a reliable signature for its class.

FIG. 6 presents the results after the application of Algorithm 1 over all the devices in the CPS testbed. As can be observed, in all the cases, the autocorrelation values are all greater than 0.6, which marks the threshold used to indicate moderate to high autocorrelation. All of these results were obtained after 30 different PSCL realization of the same devices, but in different time intervals.

Figure 8:
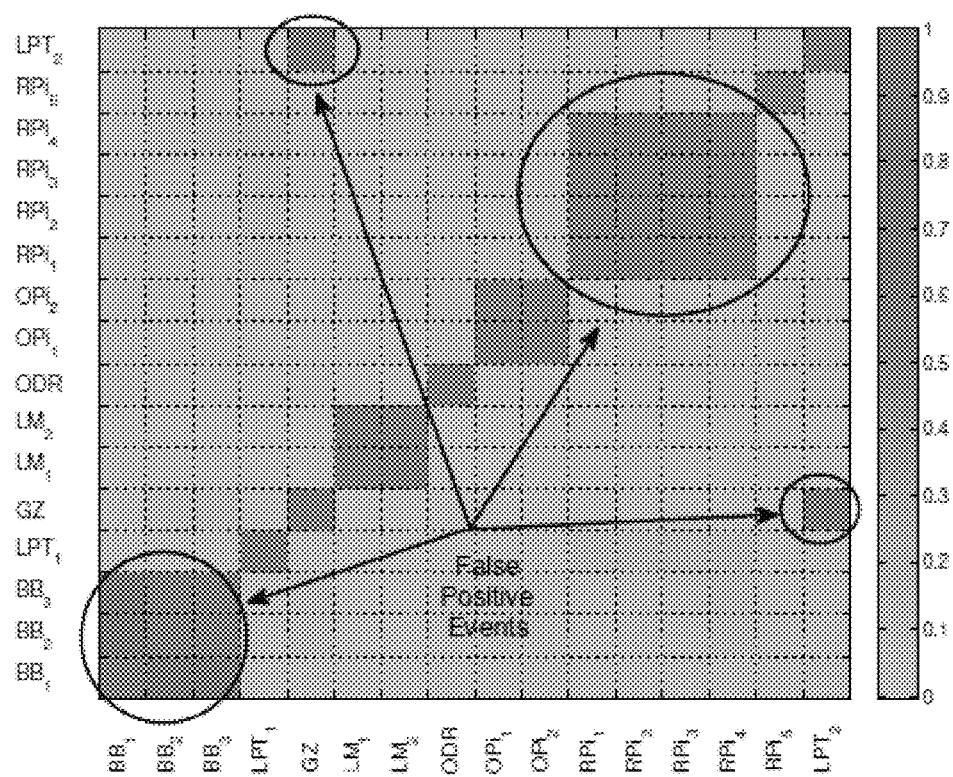
FIG. 8 shows a plot of a correlation matrix for device class identification using PSCL based correlation only. False positives as a result of applying PSCL based correlation only are circled (e.g., between GZ and $LPT_2$).

Signature generation process was repeated for every class of CPS device in the testbed. After this step, proposed fingerprinting techniques were used to identify different classes of CPS devices. As per Algorithm 2, this step starts by finding the corresponding signature of the unknown device. System call tracing techniques (library interposition) were applied to generate the PSCL of the unknown device. Additionally, DPI was calculated. FIG. 8 presents the correlation map (N×N PSCL based correlation matrix) between all PSCL from all the devices in the testbed without including DPI analysis. A darker region indicates high correlation while lighter regions indicate lower correlation values between PSCL from different devices. From PSCL correlation, 9 different classes of devices were identified and false positive were obtained between GZ and $LPT_2$ among others. By applying PSCL correlation only, accuracy values greater than 0.87 were obtained for devices $RPi_4$, $RPi_2$ and $BB_1$, and 0.94 for GZ, $BB_3$, $LPT_2$ and $BB_2$ respectively (see, for example, FIG. 7). Additionally, precision, recall and specificity metrics have been affected due the false positive values as seen in FIG. 8. These results were improved later by combining the PSCL based correlation approach with the DPI technique.

EXAMPLE 2

Figure 10:
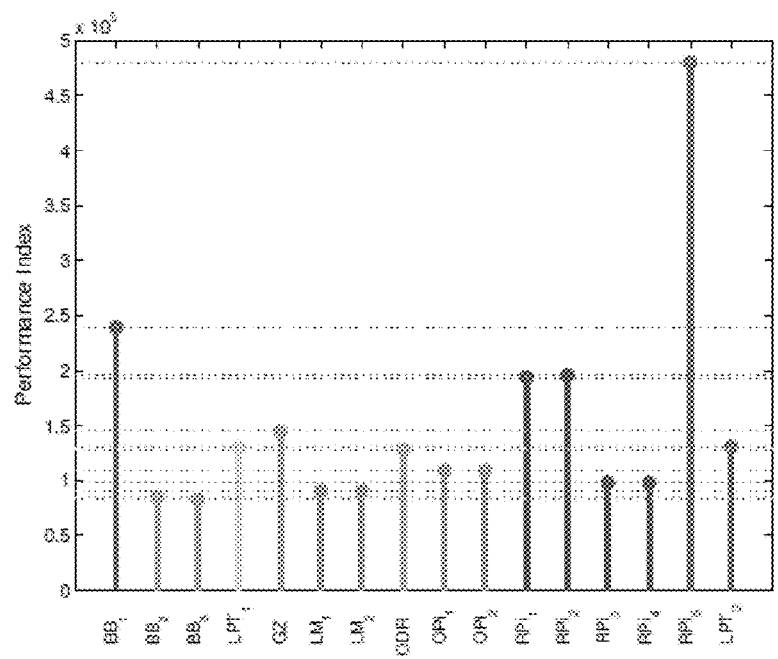
FIG. 10 shows a plot of the average value of the DPI for all the devices included in a testbed.

The DPI for every class of CPS device in the testbed was calculated using Equation 2. In FIG. 10, the results of DPI calculation are shown. As can be seen, some differences between device classes can be established, however not all the values are distinct enough to be used for identification purposes utilizing DPI criteria only.

As seen in FIG. 9, the different DPI values are represented vs the average of DPI for all the devices that cannot be identified using PSCL correlation only. From analyzing this FIG. 9, it is evident that there are obvious differences that we can exploit in the fingerprinting method.

EXAMPLE 3

Figure 11:
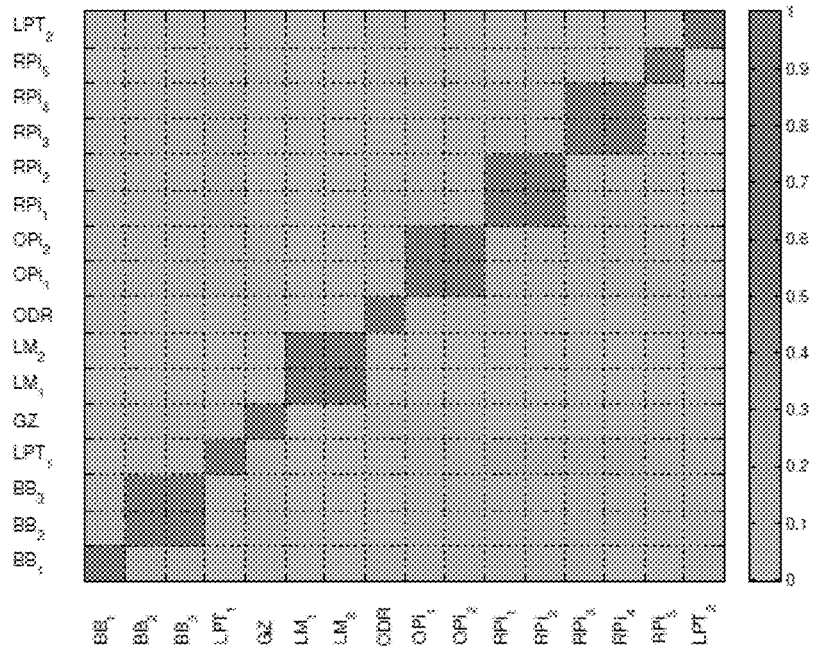
FIG. 11 shows a plot of shows a plot of a correlation matrix for device class identification using PSCL and DPI based correlation.
Figure 12A:
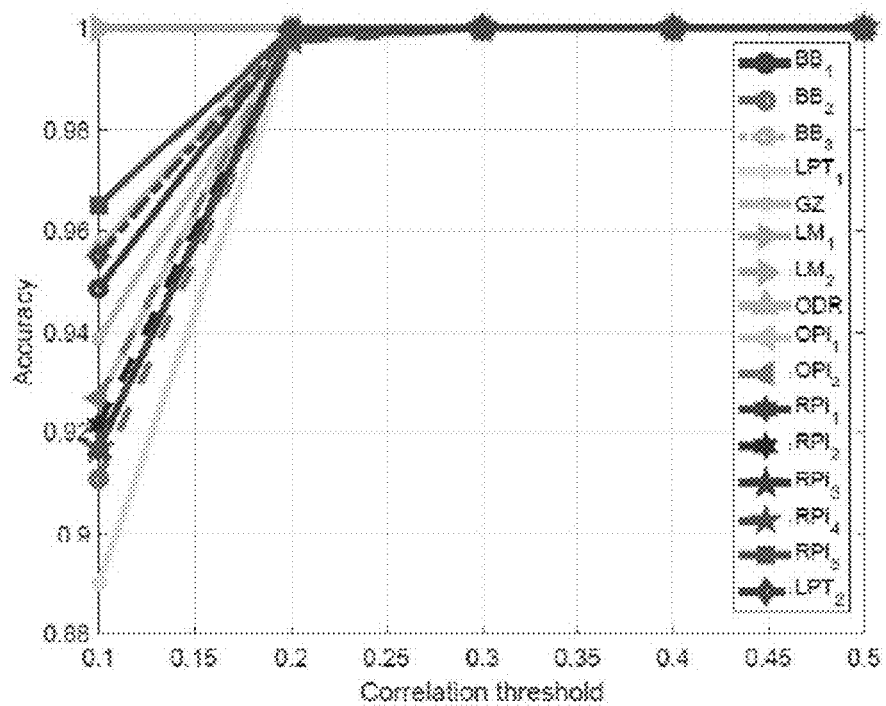
FIG. 12(a) Accuracy.
Figure 12B:
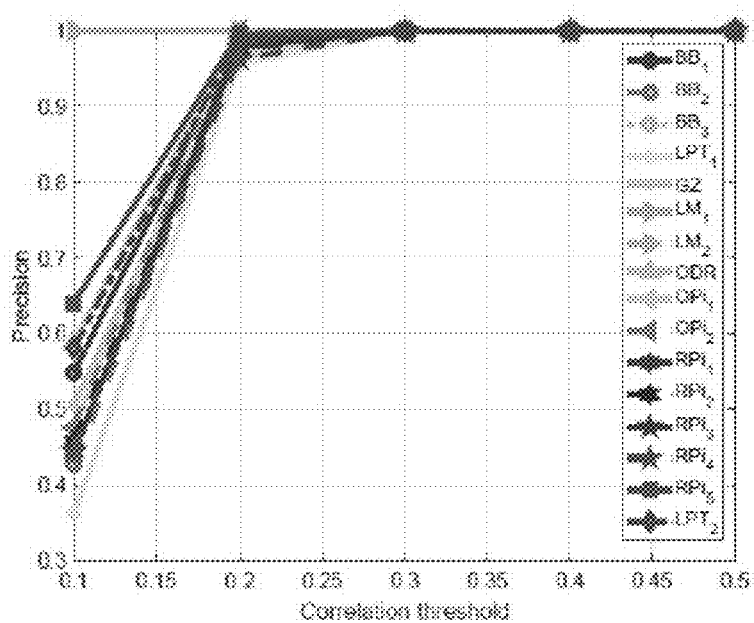
FIG. 12(b) Precision.
Figure 12C:
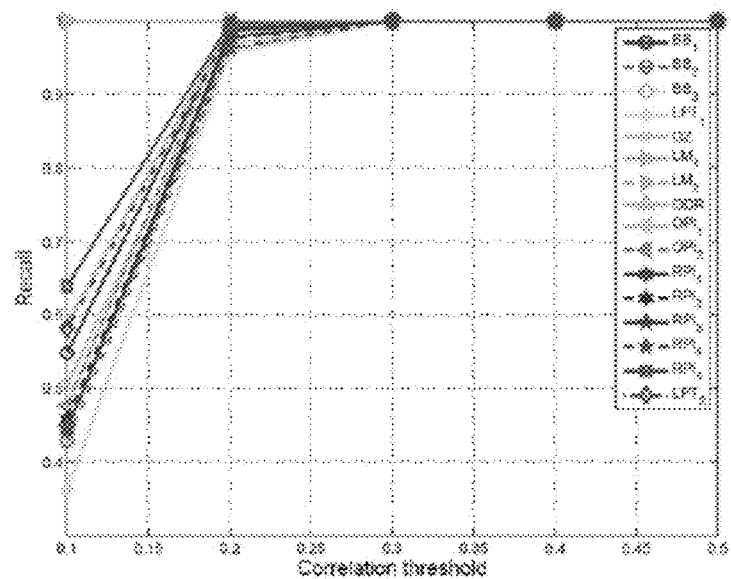
FIG. 12(c) Recall.
Figure 12D:
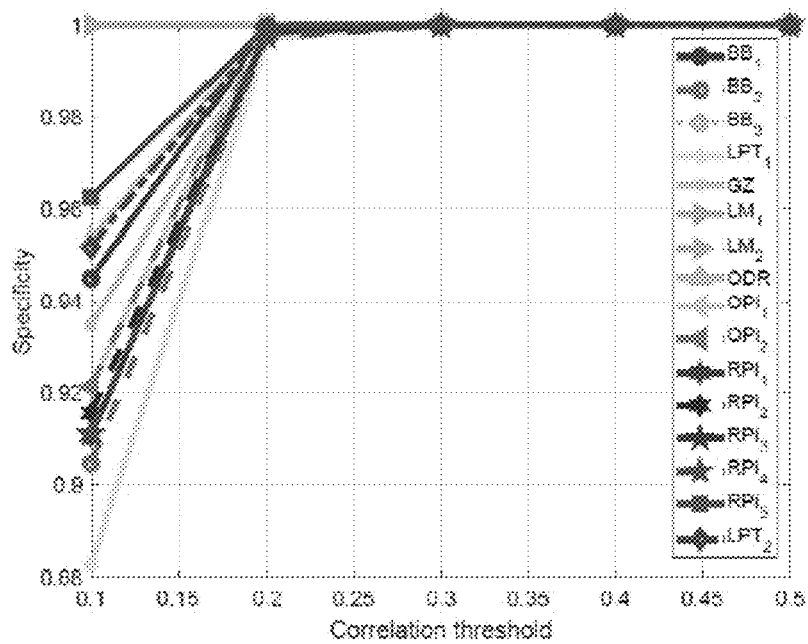
FIG. 12(d) Specificity.

Both PSCL correlation and DPI were combined to obtain a new decision map as seen in in FIG. 11. 11 different device classes are clearly identified as results did not include false positives. Performance metrics results were also improved after applying the DPI technique. In FIG. 12(a) shows a plot of the accuracy of the technique after combining PSCL correlation and DPI in the analysis. As can be observed, the metrics improved and now, accurate results in the identification of all the device classes included in the testbed.

Table I summarizes the overhead that the application of the technique can introduce on the device's computing resources. Despite the benefits of the technique, the characteristics of the CPS devices do not allow for too much overhead. CPS devices are normally very limited in resource availability, so proposing heavy methods for security analysis would be infeasible in CPS. In this case, the system overhead was calculated by analyzing the performance of the devices under normal operating conditions with and without applying the fingerprinting technique. The difference in performance is reflected in Table I. In this table RT refers to Real Time, CPU refers to CPU utilization, Mem refers to memory utilization and Total Mem refers to the percent of memory that the technique utilizes respect to the total memory available in the device. From the results, it can be seen that the worst case scenario for memory utilization is found for devices $LM_1$, $LM_2$, $OP_{i_1}$ and $OP_{i_2}$. In these cases, the amount of memory used by the specific CPS application that is being monitored by the technique increases between 17-19%, if compared with the performance of the same application without utilizing the fingerprinting technique. These percent values do not suggest that that technique utilizes 17-19% of the total memory available in the device, rather that the increment in memory utilization while executing the CPS application are within this range. To further understand this, please refer to the following example. A device $LM_1$ needs 640 KB of memory to communicate with other devices via GOOSE messages. On the other hand, the same device would need 752 KB of memory to perform the same activity while using the identification method. That means, only 112 KB (0.02%) of extra memory is needed out of the total amount of memory in the device. With more memory availability and quicker memory architectures, the technique can perform much better. Another aspect that needs to be considered is that the fingerprinting technique does not require long periods of monitoring the CPS devices (in this case, only approximately 1 minute is required to identify the device). For the case of CPU utilization and real time, similar results were obtained. In all the cases, the overhead introduced by the technique was minimal.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] D. Van Opstal, U.S. Resilience Project, "Supply chain solutions for smart grid security: Building on business best practices." September 2012. [Online]. Available: http://usresilienceproject.org/wp-content/uploads/2014/09/report-Supply Chain Solutions for Smart Grid Security.pdf

[2] Z. Zhou, W. Diao, X. Liu, and K. Zhang, "Acoustic fingerprinting revisited: Generate stable device id stealthily with inaudible sound," in *Proceedings of the 2014 ACM SIGSAC Conference on Computer and Communications Security*, ser. CCS '14. New York, N.Y., USA: ACM, 2014, pp. 429-440. [Online]. Available: http://doi.acm.org.ezproxy.fiu.edu/10.1145/2660267.2660300

[3] A. Das, N. Borisov, E. Chou, and M. H. Mughees, "Smartphone fingerprinting via motion sensors: Analyzing feasiblity at large-scale and studing real usage patterns," *CoRR*, vol. abs/1605.08763, 2016. [Online]. Available: http://arxiv.org/abs/1605.08763

[4] T. Kohno, A. Broido, and K. C. Claffy, "Remote physical device fingerprinting," *IEEE Transactions on Dependable and Secure Computing*, vol. 2, no. 2, pp. 93-108, April 2005.

[5] F. Lanze, A. Panchenko, B. Braatz, and A. Zinnen, "Clock skew based remote device fingerprinting demystified," in *Global Communications Conference (GLOBECOM), 2012 IEEE*, December 2012, pp. 813-819.

[6] J. Spooren, D. Preuveneers, and W. Joosen, "Mobile device fingerprinting considered harmful for risk-based authentication," in *Proceedings of the Eighth European Workshop on System Security*, ser. EuroSec '15. New York, N.Y., USA: ACM, 2015, pp. 6:1-6:6.[Online]. Available: http://doi.acm.org.ezproxy.fiu.edu/10.1145/2751323.2751329

[7] Q. Xu, R. Zheng, W. Saad, and Z. Han, "Device fingerprinting in wire-less networks: Challenges and opportunities," *IEEE Communications Surveys Tutorials*, vol. 18, no. 1, pp. 94-104, Firstquarter 2016.

[8] D. Formby, P. Srinivasan, A. Leonard, J. Rogers, and R. A. Beyah, "Who's in control of your control system? device fingerprinting for cyber-physical systems," in 23*nd Annual Network and Distributed System Security Symposium, NDSS* 2016, San Diego, Calif., USA, Feb. 21-24, 2016, 2016.

[9] C. Kriger, S. Behardien and J. Retonda-Modiya, "A Detailed Analysis of the GOOSE Message Structure in an IEC 61850 Standard-Based Substation Automation System," *Int. Journal Comp. Comm.*, vol. 8, no. 5, pp. 708-721, October 2013.

[10] IEC61850-7-1, "Communication networks and systems for power utility automation—Part 7-1: Basic communication structure—Principles and models," 2003. [Online]. Available: https://webstore.iec.ch/publication/6014

[11] IEC 61850-8-1, "Communication networks and systems in substations—Specific Communication Service Mapping (SCSM) Mappings to MMS (ISO 9506-1 and ISO 9506-2) and to ISO/IEC 8802-3," 2003. [Online]. Available: https://webstore.iec.ch/p-preview/info iec61850-8-1%7Bed1.0%7Den.pdf

[12] IEC 61850-1, "Communication networks and systems in substations Introduction and overview," 2003. [Online]. Available: https://webstore.iec.ch/p-preview/info iec61850-1%7Bed1.0%7Den.pdf

[13] IEC 61850-7-2, "Communication networks and systems in substations Basic communication structure for substation and feeder equipment Abstract Communication Service Interface (ACSI)," 2003. [Online]. Available: https://webstore.iec.ch/p-preview/info iec61850-7-2%7Bed1.0%7Den.pdf

[14] M, Sillgith, "Open source library for IEC 61850: Release 0.9," February 2016. [Online]. Available: http://libiec61850.com/libiec61850/

[15] I. Graja, S. Kallel, N. Guermouche, and A. H. Kacem, "Bpmn4cps: A bpmn extension for modeling cyber-physical systems," in 2016 *IEEE 25th International Conference on Enabling Technologies: Infrastructure for Collaborative Enterprises (WETICE)*, June 2016, pp. 152-157.

[16] I. Akkaya, P. Derler, S. Emoto, and E. A. Lee, "Systems engineering for industrial cyber physical systems using aspects," *Proceedings of the IEEE*, vol. 104, no. 5, pp. 997-1012, May 2016.

[17] D. B. Rawat and C. Bajracharya, "Cyber security for smart grid systems: status, challenges and perspectives," in *Proceedings of the IEEE Southeast Conf.* Fort Lauderdale, Fla., USA: IEEE, 2015, pp. 1-6.

[18] Y. Deng and S. Shukla, "Vulnerabilities and countermeasures—A survey on the cyber security issues in the transmission subsystem of a smart grid," *Journal of Cyber Security and Mobility*, vol. 1, pp. 251-276, 2012.

[19] B. Bencsth, G. Pk, L. Buttyn, and M. Flegyhzi, "The cousins of stuxnet: Duqu, flame, and gauss," *Future Internet*, vol. 4, no. 4, p. 971, 2012. [Online]. Available: http://www.mdpi.com/1999-5903/4/4/971

[20] C. Konstantinou, M. Maniatakos, F. Saqib, S. Hu, J. Plusquellic, and Y. Jin, "Cyber-physical systems: A security perspective," in 2015 *20$^{th}$ IEEE European Test Symposium (ETS)*, May 2015, pp. 1-8.

[21] F. Koushanfar and et al., "Can EDA combat the rise of electronic counterfeiting?" in *Proc. of ACM/EDAC/IEEE Design Automation Conference*. San Fransisco, Calif.: IEEE, 2012, pp. 133-138.

[22] A. Kanovsky, P. Spanik and M. Frivaldsky, "Detection of electronic counterfeit components," in 2015 *16th Int. Scientific Conf. on Electric Power Engineering (EPE)*. Kouty nad Desnou: IEEE, May 2015, pp. 701-705.

[23] K. Huang, J. M. Carulli, and Y. Makris, "Counterfeit electronics: A rising threat in the semiconductor manufacturing industry," in *ITC. IEEE Computer Society*. IEEE, 2013, pp. 1-4.

[24] S. Sharma, A. Hussain, and H. Saran, "Experience with heterogenous clock-skew based device fingerprinting," in *Proceedings of the* 2012 *Workshop on Learning from Authoritative Security Experiment Results*, ser. LASER '12. New York, N.Y., USA: ACM, 2012, pp. 9-18. [Online]. Available: http://doi.acm.org/10.1145/2379616.2379618

[25] A. Das, N. Borisov, and M. Caesar, "Do you hear what i hear?: Fingerprinting smart devices through embedded acoustic components," in *Proceedings of the* 2014 *ACM SIGSAC Conference on Computer and Communications Security*, ser. CCS '14. New York, N.Y., USA: ACM, 2014, pp. 441-452. [Online]. Available: http://doi.acm.org.ezproxy.fiu.edu/10.1145/2660267.2660325

[26] T. Park, S. Beack, and T. Lee, "A noise robust audio fingerprint extraction technique for mobile devices using gradient histograms," in *Consumer Electronics-Berlin (ICCE-Berlin)*, 2015 IEEE *5th International Conference on*, September 2015, pp. 287-290.

[27] C. Neumann, O. Heen, and S. Onno, "An empirical study of passive 802.11 device fingerprinting," in 2012 *32nd International Conference on Distributed Computing Systems Workshops*, June 2012, pp. 593-602.

[28] S. Bratus, C. Cornelius, D. Kotz, and D. Peebles, "Active behavioral fingerprinting of wireless devices," in *Proceedings of the First ACM Conference on Wireless Network Security*, ser. WiSec '08. New York, N.Y., USA: ACM, 2008, pp. 56-61. [Online]. Available: http://doi.acm.org.ezproxy.fiu.edu/10.1145/1352533.1352543

[29] K. Gao, C. Corbett, and R. Beyah, "A passive approach to wireless device fingerprinting," in 2010 *IEEE/IFIP International Conference on Dependable Systems Networks (DSN)*, June 2010, pp. 383-392.

[30] A. S. Uluagac, S. V. Radhakrishnan, C. Corbett, A. Baca, and R. Beyah, "A passive technique for fingerprinting wireless devices with wired-side observations," in *Communications and Network Security (CNS), 2013 IEEE Conference on*, October 2013, pp. 305-313.

[31] S. V. Radhakrishnan, A. S. Uluagac, and R. Beyah, "Gtid: A technique for physical device and device type fingerprinting," *IEEE Transactions on Dependable and Secure Computing*, vol. 12, no. 5, pp. 519-532, September 2015.

[32] T. Garfinkel, "Traps and pitfalls: Practical problems in system call interposition based security tools," in *In Proc. Network and Distributed Systems Security Symposium*, 2003, pp. 163-176.

[33] Sheldon M. Ross, "Probability Models for Computer Science (1st ed.). Academic Press, Inc, Orlando, Fla., USA.

What is claimed is:

1. A method of device and device class classification, the method comprising:
   providing a known cyber physical system (CPS) device;
   extracting, by an extracting device, using system and function call tracing techniques, system and function calls and parameters from the known CPS device;
   extracting, by the extracting device using system and function call tracing techniques, system and function calls and parameters at different time intervals from the known CPS device;
   calculating an autocorrelation value between different realizations of the system and function calls and parameters of the known CPS device;
   determining whether the autocorrelation value is greater than a threshold amount; and
   storing in computer memory, the system and function calls and parameters of the known CPS device whose autocorrelation value is greater than the threshold amount in a database,
   the database being subdivided into classes of CPS devices.

2. The method of claim 1, further comprising:
   inserting the system and function calls and parameters in a vector expressed as follows:

$$PSCL_i = \{x_i \in X_i : \exists X_i \wedge X_i \neq \emptyset\},$$

$x_i$ representing parameters from system and function calls from device i and $X_i$ representing system and function call lists from device i.

3. The method of claim 2, further comprising:
   calculating the autocorrelation between different realizations of the system and function calls and parameters of the known CPS device using the following expression:

$$\rho_{Y_i Y_{i+t}} = \frac{\sum y_i y_{i+t} - n \overline{y_i y_{i+t}}}{n s_{y_i} s_{y_{i+t}}},$$

$y_i$ and $y_{i+t}$ representing PSCLs from a same CPS process but from a different time interval t, n representing the size of the array y (size of PSCL), and s representing the standard deviation.

4. The method of claim 1, the threshold value of the autocorrelation value between different realizations of the system and function calls and parameters of the known CPS device being 0.6.

5. The method of claim 1, further comprising:
   providing an unknown CPS device;
   extracting, by the extracting device, using system and function call tracing techniques, system and function calls and parameters from the unknown CPS device;
   calculating a correlation value between the system and function calls and parameters of the unknown CPS device and systems and function calls and parameters of each CPS class device in the database;
   determining whether the correlation value is greater than a threshold amount;
   accepting the unknown device whose maximum correlation value is also greater than the threshold amount in the database as a known CPS device; and
   storing, in computer memory, the system and function calls and parameters of the known CPS device in the database.

6. The method of claim 5, further comprising:
   storing, in the computer memory, the system and function calls and parameters of the known device whose correlation value is equal to or less than the threshold amount in the database as a new class of CPS device.

7. The method of claim 6, the threshold amount of the correlation between system and function calls and parameters of the unknown device and each system and function calls and parameters of each CPS class device in the database being 0.6.

8. The method of claim 6, the correlation between the system and function calls and parameters of the unknown CPS device and the system and function calls and parameters in the database being calculated using the following expression:

$$\rho_{XY} = \frac{\sum x_i y_i - n \overline{xy}}{n s_x s_y},$$

n representing a size of $x_i$ and $y_i$ which are ground truth PSCL and unknown CPS device PSCL, respectively, $\bar{x}$ and $\bar{y}$ representing a mean, and $s_x$ and $s_y$ representing a standard deviation.

9. The method of claim 1, further comprising:
   extracting, by an extracting device, device performance characteristics from the known CPS device and the device performance characteristics of an unknown CPS device.

10. The method of claim 9, the device performance characteristics including memory utilization, CPU utilization, and real time of application execution.

11. The method of claim 10, the device performance characteristics being expressed as the following equation:

$$DPI = \bar{\alpha} \times \bar{\beta} \times \bar{\gamma},$$

$\bar{\alpha}$ representing an average of memory utilization, $\bar{\beta}$ representing an average of CPU utilization, and $\bar{\gamma}$ representing a time period that an application takes to execute a specific task.

12. The method of claim 1, further comprising: storing, in computer memory, a device signature for each known and unknown CPS device as a function of a parametric system call list (PSCL) and a device performance index (DPI).

13. A non-transitory computer-readable storage medium comprising stored instructions thereon, the instructions when executed causing a processor to:
   receive system and function calls and parameters from a known CPS device;
   receive device performance characteristics from the known CPS device;
   receive system and function calls and parameters at different time intervals from the known CPS device;
   receive device performance characteristics at different time intervals from the known device;
   calculate an autocorrelation value between different executions of the system and function calls and parameters of the known CPS device;
   determine whether the autocorrelation value is greater than a threshold amount; and
   store the system and function calls and parameters of the known CPS device whose autocorrelation value is greater than a threshold amount in a database,
   the database being subdivided into classes of CPS devices.

14. The method of claim 13, the device performance characteristics being expressed as the following equation:

$$DPI = \bar{\alpha} \times \bar{\beta} \times \bar{\gamma},$$

$\bar{\alpha}$ representing an average of memory utilization, $\bar{\beta}$ representing an average of CPU utilization, and $\bar{\gamma}$ representing a time period the application takes to execute a specific task.

15. The method of claim 13, the instructions when executed further causing the processor to:
   calculate the autocorrelation between different realizations the system and function calls and parameters of the known CPS device with the following expression:

$$\rho_{Y_i Y_{i+t}} = \frac{\sum y_i y_{i+t} - n \overline{y_i y_{i+t}}}{n s_{y_i} s_{y_{i+t}}},$$

$y_i$ and $y_{i+t}$ representing PSCLs from a same CPS process but from a different time interval t, n representing a size of an array y (size of PSCL), and s representing a standard deviation.

16. The method of claim 14, the threshold value of the autocorrelation value between different realizations of the system and function calls and parameters of the known CPS device being 0.6.

17. The method of claim 14, the instructions when executed further causing the processor to:
   receive system and function calls and parameters from an unknown CPS device;
   calculate a correlation value between the system and function calls and parameters of the unknown CPS device and the system and function calls and parameters of each CPS device class in the database;
   determine whether the correlation value is greater than a threshold amount;
   accept the unknown device whose maximum correlation value is also greater than the threshold amount in the database as a known CPS device; and
   store the system and function calls and parameters of the unknown CPS device in the database.

18. The method of claim 16, the threshold value of the correlation value between system and function calls and parameters of the unknown CPS device and the system and function calls and parameters of each CPS device class in the database being 0.6.

19. The method of claim 17, the correlation between the system and function calls and parameters of the unknown CPS device and the system and function calls and parameters of each CPS device class in the database being calculated using the following expression:

$$\rho_{XY} = \frac{\sum x_i y_i - n \overline{xy}}{n s_x s_y},$$

n representing a size of $x_i$ and $y_i$ which are ground truth PSCL and unknown CPS device PSCL, respectively, and y representing a mean, and $s_x$ and $s_y$ representing a standard deviation.

20. A non-transitory computer-readable storage medium comprising stored instructions thereon, the instructions when executed causing a processor to:
   receive system and function calls and parameters from a known Cyber Physical Systems (CPS) device;
   receive characteristic parameters related to memory utilization, CPU utilization, and real time of application execution from the known CPS device;
   receive system and function calls and parameters from a known CPS device;
   receive characteristic parameters related to memory utilization, CPU utilization, and real time of application execution from the unknown CPS device;
   calculate an autocorrelation value between different realizations of the system and function calls and parameters of the known CPS device;
   determine whether the autocorrelation value is greater than 0.6;
   store the system and function calls and parameters of the known CPS device whose autocorrelation value is greater than 0.6 in a database,
   the database being subdivided into classes of CPS devices;
   receive system and function calls and parameters from an unknown CPS device;
   receive characteristic parameters related to memory utilization, CPU utilization, and real time of application execution from the known CPS device;
   receive from the database, system and function calls and parameters of each CPS device class;
   calculate a correlation value between the system and function calls and parameters of the unknown CPS device and the system and function calls and parameters of each CPS device class in the database;
   determine whether the correlation value is greater than 0.6;
   accept the unknown device whose maximum correlation value is also greater 0.6 in the database as a known CPS device; and
   store the system and function calls and parameters and the device performance characteristics of the unknown CPS device in the database.

* * * * *